United States Patent [19]

Oldakowski

[11] 4,246,991

[45] Jan. 27, 1981

[54] LINEAR MOTION MECHANISM WITH MEANS FOR PREVENTING BACK FORCES

[75] Inventor: Stephen Z. Oldakowski, Bedford, Ohio

[73] Assignee: Lear Siegler, Inc., Santa Monica, Calif.

[21] Appl. No.: 900,238

[22] Filed: Apr. 26, 1978

[51] Int. Cl.³ .............................................. F16D 67/00
[52] U.S. Cl. ................................. 192/8 C; 192/12 BA
[58] Field of Search ........................... 192/8 C, 12 BA

[56] References Cited

U.S. PATENT DOCUMENTS

| | | | |
|---|---|---|---|
| 307,663 | 11/1884 | Lane | 192/8 C |
| 2,075,567 | 3/1937 | Benedek | 192/8 C X |
| 2,946,417 | 7/1960 | Hungerford | 192/8 C |
| 3,621,958 | 11/1971 | Klemm | 192/8 R |
| 3,796,292 | 3/1974 | Harrison | 192/8 C |
| 3,930,566 | 1/1976 | Matsushima | 192/8 C |

*Primary Examiner*—George H. Krizmanich
*Attorney, Agent, or Firm*—Pearne, Gordon, Sessions, McCoy & Granger

[57] ABSTRACT

A mechanism is disclosed which produces linear motion from a rotating input while preventing the transmission of back forces in either direction. The mechanism includes a housing with an output shaft mounted for rotation within the housing. A rotatable input drive means is mounted coaxial with the shaft. The drive means includes a radially extending impelling portion. The output shaft extends axially on both sides of the impelling portion. A tubular hub is fixedly mounted on the housing and extends around the output shaft on each side of the impelling portion of the drive means. A pair of coil springs are wrapped around the output shaft with one spring on each side of the impelling portion of the drive means. Each spring has a release toe at one end which extends axially to the impelling portion and which is capable of being engaged by the impelling portion upon rotation of the drive means. The other end of each spring engages the shaft, so that the spring rotates with the shaft. A portion of each spring has a relaxed outer diameter larger than the inner diameter of the hub, so that the springs engage the hub when relaxed. Means are provided for producing linear motion from the rotation of the output shaft.

9 Claims, 6 Drawing Figures

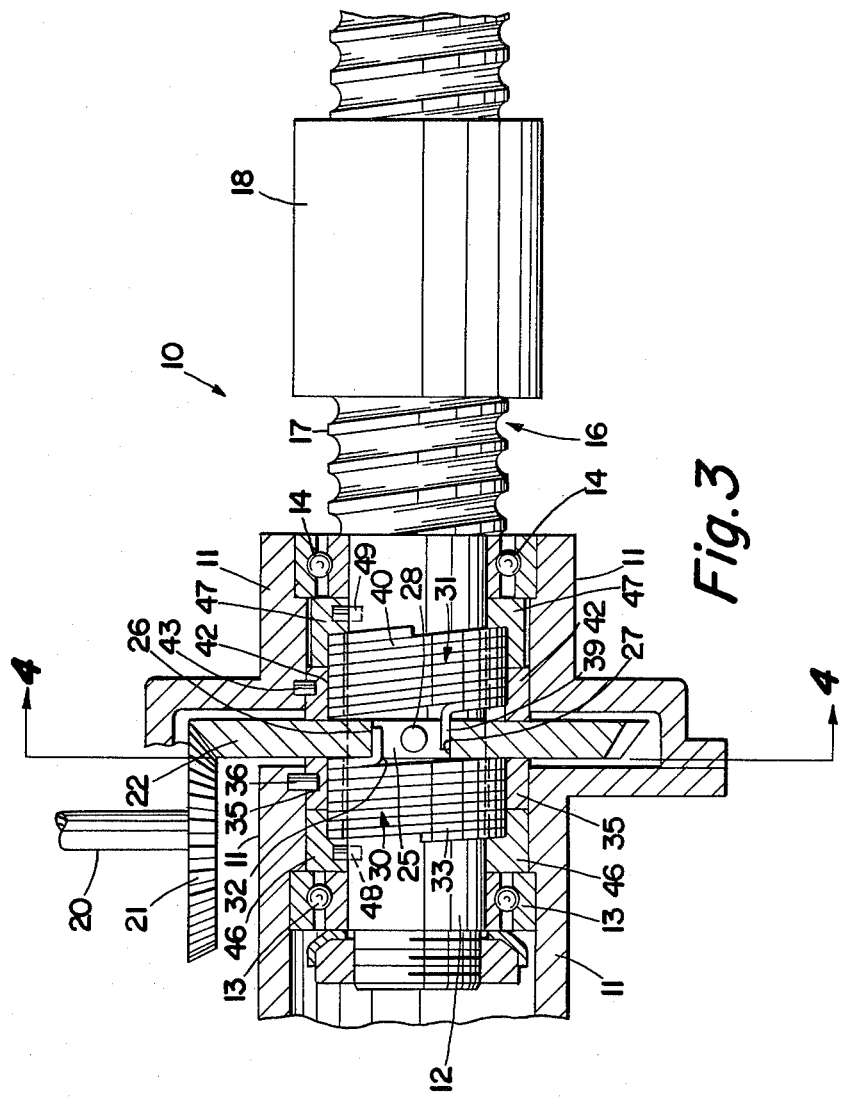
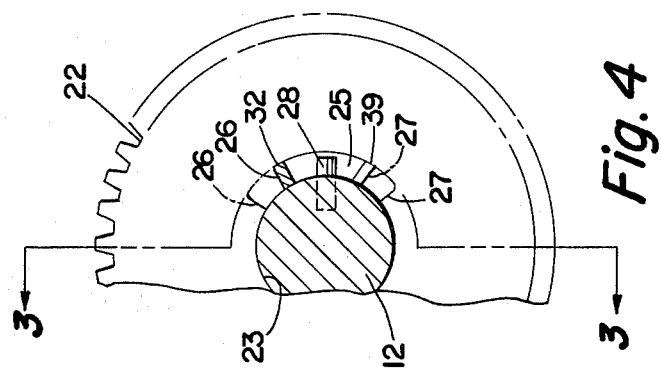
Fig. 3
Fig. 4

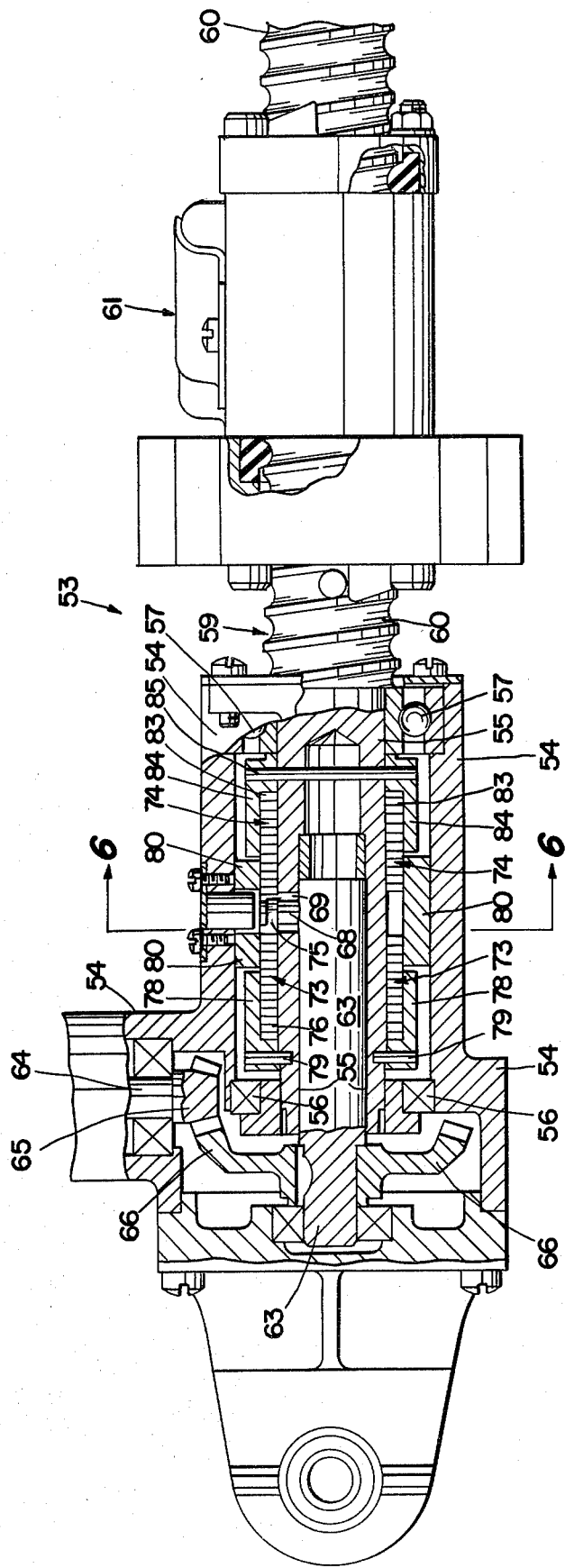
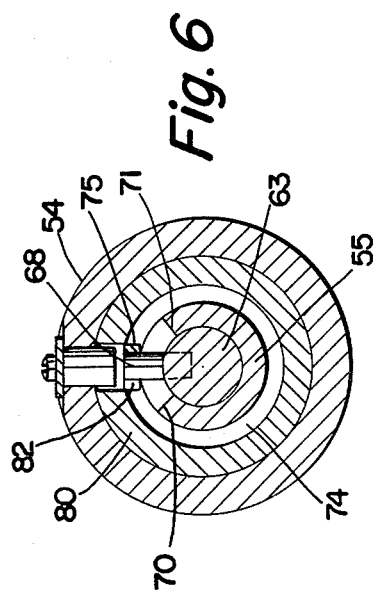

4,246,991

LINEAR MOTION MECHANISM WITH MEANS FOR PREVENTING BACK FORCES

BACKGROUND OF THE INVENTION

1. Field of the Invention

This invention relates to mechanisms for producing linear motion from a rotatable input drive means, and particularly those mechanisms which include means for preventing forces on the driven element from being transmitted back to the input drive means.

2. Description of the Prior Art

Known mechanisms are available for operating a linearly driven element, such as a control element from a rotatable input drive means. For example, such control elements may include a flap used in the flight control of airplanes. External forces on the control element may tend to move the control device undesirably. If the control element is permitted to be moved by these external forces, a loss in control may result. In addition, these external forces may backdrive the input drive means, and such back forces may be detrimental to the input drive means.

Mechanisms are available for locking out backdriven forces and preventing these forces from being transmitted to the input drive means while being capable of deactuation upon activation of the input drive means to allow the input drive means to operate the control element. Known locking means of this type have often been characterized by significant friction losses which significantly adversely affect the efficiency of such mechanisms.

SUMMARY OF THE INVENTION

The present invention provides a unique efficient design for a linear motion mechanism which prevents the transmission of back forces. The mechanism includes a housing with an output shaft mounted for rotation within the housing. A rotatable input drive means is mounted coaxial with the output shaft. The input drive means includes a radially extending impelling portion. The output shaft extends axially on both sides of the impelling portion. A tubular hub is fixedly mounted on the housing and extends around the output shaft on each side of the impelling portion of the drive means. A pair of coil springs are wrapped around the output shaft, one spring on each side of the impelling portion of the drive means. Each spring has a release toe at one end which extends axially to the impelling portion and which is capable of being engaged by the impelling portion upon rotation of the drive means. The other end of each spring engages the shaft to rotate therewith. A portion of each spring has a relaxed outer diameter larger than the inner diameter of the hub, whereby the springs engage the hub when relaxed. The mechanism also includes means, such as a ball screw and ball nut, for producing linear motion as the output shaft rotates.

Among the advantages of the present invention, it provides a wrapped spring mechanism which blocks back forces in both directions and which is located directly on the output shaft having means for producing linear motion, in which axial loading on the linearly driven element does not result in torque on the shaft. The design of the mechanism allows the input drive means to be coaxial and connected directly to the output shaft having the means for producing linear motion. The impelling portion of the drive means drives the spring anchored to the output shaft, resulting in a shock-absorbing capability. The present invention also provides a mechanism in which the failure of any drive member, including the springs, causes the output shaft to be locked in its last operational position, as the springs couple the output shaft directly to the hub, and the springs are contained in place by appropriate means. The mechanism provides a means for transferring axial tension and compression loads from a linearly driven element to a fixed housing structure through the output shaft, support bearings, and the springs with a minimum number of load carrying parts or interconnecting members. The device also provides an irreversible rotatable output shaft within a minimum envelope or space. The spring mechanism also prevents "creeping" during vibration when used in combination with any type of jackscrew, such as a ball screw or acme screw.

BRIEF DESCRIPTION OF THE DRAWINGS

FIG. 3 is a side elevational view partially in section, similar to FIG. 1, showing another embodiment of the present invention.

FIG. 4 is an end sectional view taken along line 4—4 of FIG. 3.

FIG. 5 is a side elevational view of another alternative embodiment of the mechanism of the present invention.

FIG. 6 is an end sectional view taken along line 6—6 of FIG. 5.

DETAILED DESCRIPTION OF THE PREFERRED EMBODIMENT

Figure 1:
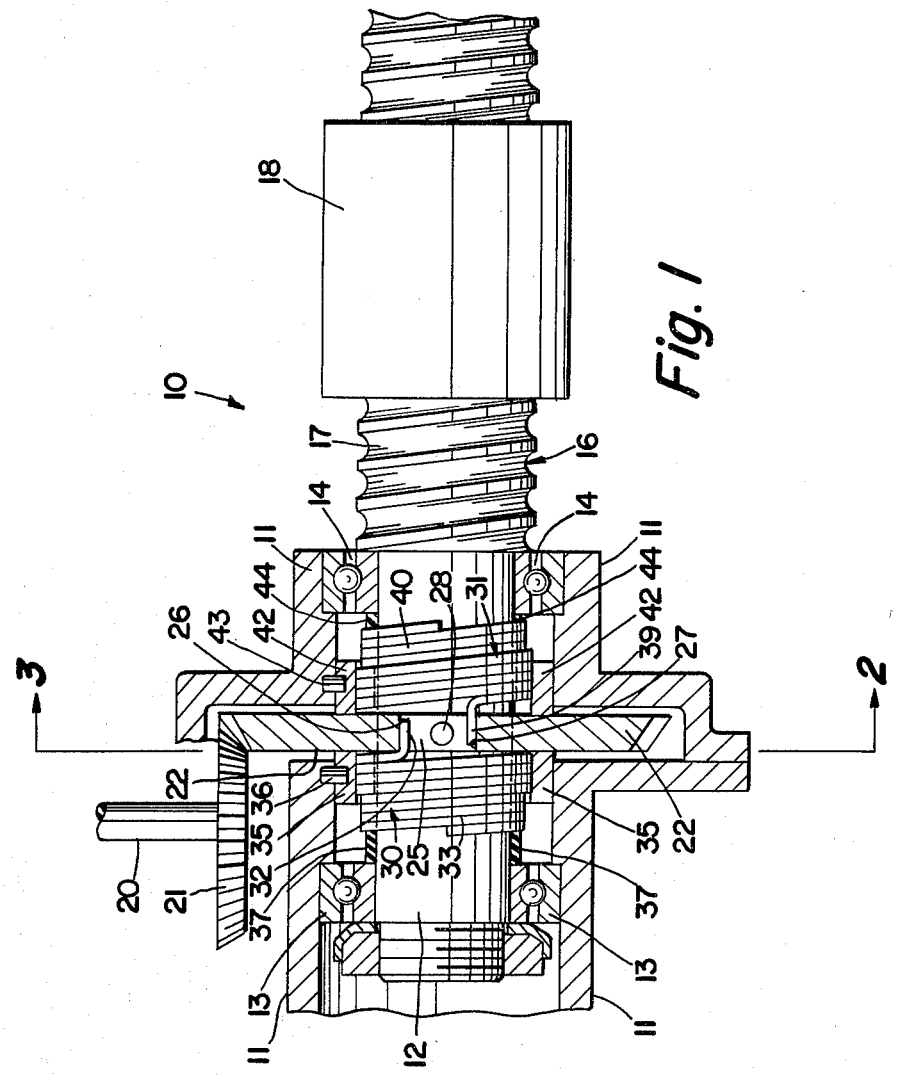
FIG. 1 is a side elevational view partially in section of a preferred embodiment of the mechanism of the present invention.

FIG. 1 shows a linear motion mechanism 10 of the present invention. The mechanism 10 is contained in a generally cylindrical housing 11. A rotatable output shaft 12 extends through the housing 11 and is supported for rotation by bearings 13 and 14. The shaft 12 has a threaded portion 16 at one end which extends from the housing 11 to form a ball screw 17 upon which is mounted a ball nut 18. Rotation of the shaft 12 results in rotation of the ball screw 17, producing linear translation of the ball nut 18.

The output shaft 12 is rotated by drive means which includes a drive shaft 20 having a bevel gear 21 at one end. The gear 21 engages a bevel gear 22 which is coaxially mounted on the shaft 12. The gear 22 has a central opening 23 (FIG. 2) through which the shaft 12 extends. A recess is formed along a portion of the opening 23 providing an impelling portion in the form of a circumferentially elongated keyway 25 extending between a pair of radially and axially extending walls 26 and 27. A pin 28 is secured in the shaft 12, such as by screwing a threaded portion of the pin into a correspondingly threaded hole in the shaft. The pin 28 projects radially from the shaft 12 and extends into the keyway 25.

The rotation of the drive gear 22 is transmitted to the shaft 12 by means of a pair of coil springs 30 and 31 which are wrapped around the shaft 12, one spring on each side of the gear 22. On one end of the spring 30 is an axially extending release toe 32 which extends into the keyway 25 between the wall 26 and the pin 28. The end portion 33 of the spring 30 opposite the release toe 32 has an inner diameter when the spring is relaxed which is slightly smaller than the outer diameter of the shaft 12 resulting in an interference fit and a reliable connection between the relaxed spring 30 and the shaft 12. A stationary tubular hub 35 is fixedly mounted to the housing 11 by means such as pins 36. When the spring 30 is relaxed, the outer diameter of the spring adjacent to the stationary hub 35 is slightly larger than the inner diameter of the hub, resulting in an interference fit between the hub 35 and the spring 30. A tubular spacer 37 is provided between the bearings 13 and the spring end portion 33 to maintain the spring 30 in position with the toe 32 extending into the keyway 25.

The spring 31 is similar to the spring 30. The spring 31 is wrapped around the shaft 12 in a direction opposite to that of the mirror image on the spring 30 reflected on the gear 22. One end of the spring 31 forms an axially extending release toe 39 which extends into the keyway 25 between the pin 28 and the wall 27. The end portion 40 of the spring 31 opposite the release toe 39 has a relaxed inner diameter slightly smaller than the outer diameter of the shaft 12, providing an interference fit between the spring 31 and the shaft 12 when the spring is relaxed. A stationary tubular hub 42 is fixedly attached to the housing 11 by means such as pins 43 and is positioned on the opposite side of the gear 22 from the stationary hub 35. The relaxed outer diameter of the spring 31 adjacent to the stationary hub 42 is slightly larger than the inner diameter of the hub, resulting in an interference fit between the hub 42 and the relaxed spring 31. A tubular spacer 44 is provided between the bearings 14 and the spring end portion 40 to maintain the spring 31 in position with the toe 39 extending into the keyway 25.

In the operation of the mechanism 10, the drive shaft 20 rotates the gear 21 and the engaging drive gear 22. As the gear 22 is driven clockwise (as viewed in FIG. 2), the wall 26 of the keyway 25 engages the release toe 32 of the spring 30. As the toe 32 is moved clockwise (downwardly in FIG. 1), the spring 30 is wrapped onto the shaft 12, decreasing the outer diameter of the spring and causing the spring to disengage from the stationary hub 35. As the spring 30 wraps around the shaft 12, it causes the shaft 12 to rotate clockwise with the gear 22. As the drive gear 22 rotates further, the pin 28 engages the release toe 22 and locks the toe between the pin and the wall 26 of the keyway 25. As the shaft 12 rotates, the end portion 40 of the other spring 31 also rotates in a clockwise direction since the spring end portion 40 is connected to the shaft 12. As the end portion 40 rotates in the clockwise direction, the outer diameter of the spring 31 decreases slightly, so that the spring disengages from the stationary hub 42. Thereafter, the output shaft 12 is driven directly by the gear 22 through engagement between the keyway wall 26 on the gear and the pin 28 on the shaft. Thus, the clockwise rotation of the drive gear 22 causes clockwise rotation of the output shaft 12 and thus clockwise rotation of the ball screw 17, moving the ball nut 18 in the forward direction (to the right in FIG. 1). Since the spring toe 32 is anchored between the pin 28 and the keyway wall 26 while the other end portion of the driving spring 30 engages the shaft 12, the mechanism is capable of absorbing shocks to the ball nut 18 and in the drive shaft 20 while linearly driving the ball nut.

Figure 2:
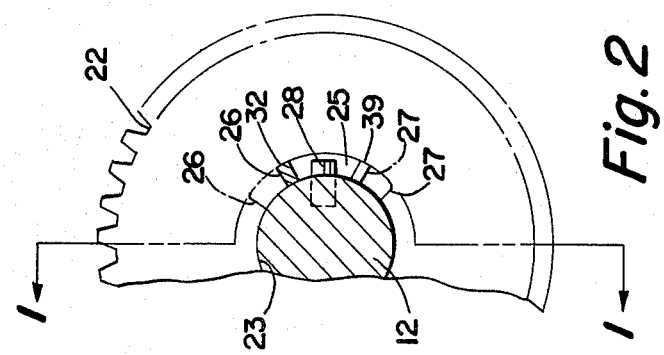
FIG. 2 is an end sectional view taken along line 2—2 of FIG. 1.

When the drive gear 22 rotates in the counterclockwise direction in FIG. 2, the wall 27 of the keyway 25 engages the spring release toe 39 causing the spring 31 to wrap around the shaft 12, decreasing the outer diameter of the spring so that the spring 31 disengages from the stationary hub 42. As the spring 31 is wrapped around the shaft 12, it causes the output shaft to rotate in the counterclockwise direction with the gear 22. The keyway wall 27 also engages the pin 28 with the release toe 39 therebetween to rotate the output shaft 12 with the gear 22. As the shaft 12 rotates, the spring end portion 33 rotates in the counterclockwise direction, wrapping the spring 30 around the shaft 12 and decreasing the outer diameter of the spring so that the spring 30 disengages from the stationary hub 35. As the shaft 12 rotates in the counterclockwise direction, the ball screw 17 rotates causing the ball nut 18 to move rearwardly (to the left in FIG. 1).

In the event of failure of any of the members of the mechanism, the output shaft 12 is locked in the last operational position. For example, if the drive gear 22 is rotating clockwise (in FIG. 2) and the driving release toe 32 breaks from the spring 30, the spring 30 would relax so that the spring would engage the stationary hub 35, locking the shaft 12 in position.

Various modifications can be made to the mechanism already described. For example, as shown in FIG. 3, a pair of rotatable hubs 46 and 47 may be used in place of the spacers 37 and 44. The rotatable hubs 46 and 47 serve to maintain the springs 30 and 31 in position with the toes 32 and 39 fully inserted into the keyway 25. The rotating hub 46 and 47 also provide an interference fit and a reliable connection between the spring end portions 33 and 40 and the rotatable shaft 12. The relaxed outer diameter of each of the spring end portions 33 and 40 is slightly larger than the inside diameters of the corresponding rotatable hub 46 or 47. The rotatable hubs 46 and 47 are pinned, keyed or attached to the shaft 12, such as by pins 48 and 49.

Other modifications and variations are also possible. For example, each of the ends of the springs 30 and 31 opposite the release toes 32 and 39 may be formed into a toe and placed into a slot in the shaft 12, while the relaxed inside diameter of each of the spring end portions 33 and 40 is made slightly larger than the outside diameter of the output shaft 12. This modification would provide a positive connection between the end portions of the springs and the output shaft 12, while allowing for torsional deflection of the springs, thus providing an energy absorbing capability during the hard stops associated with engagement of the mechanism.

To further modify the mechanism, the spring release toes may be engaged by different devices other than the keyway, such as a dowel pin or arm. Such a modified device is shown by the linear motion mechanism 53 in FIGS. 5 and 6. The mechanism 53 includes a generally cylinderical housing 54 through which extends an output shaft 55 supported for rotation by bearings 56 and 57. The shaft has a threaded portion 59 at one end which extends from the housing 54 and forms a ball screw 60 upon which is mounted a ball nut 61. As the ball screw 60 is rotated the ball nut 61 provides linear motion.

The end of the output shaft 55 opposite the threaded portion 59 is bored to provide for a coaxial input shaft 63. The shaft 63 is connected to a drive shaft 64 by means of a pair of gears 65 and 66. The impelling portion of the input shaft 63 comprises a drive pin 68 mounted in the input shaft and projecting radially from the shaft through a circumferentially elongated slot 69 formed in the output shaft 55 (FIG. 6). The ends of the slot 69 which extends completely through the hollowed portion of the shaft 55 are defined by two axially extending walls 70 and 71.

A pair of coil springs 73 and 74 (FIG. 5) are wrapped around the output shaft 55, one spring on each side of the projecting drive pin 68. The spring 73 has an axially extending release toe 75 at the end adjacent to the pin 68. The release toe 75 is positioned adjacent to and is engaged by the pin 68 (FIG. 6). The end portion 76 of the spring 73 opposite the release toe 75 is engaged by a rotatable tubular hub 78 which is attached to the shaft 55 by means such as a pin 79 (FIG. 5). The outer diameter of the spring end portion 76 is slightly larger than the inner diameter of the rotatable hub 78 resulting in an interference fit and a reliable connection between the hub 78 and the spring 73. The portion of the spring 73 adjacent to the toe 75 is engaged by a stationary tubular hub 80 which is fixedly mounted to the housing. The inner diameter of the stationary hub 80 is also slightly smaller than the outer diameter of the relaxed spring 73 resulting in an interference fit when the spring is relaxed.

The other spring 74 is wrapped around the output shaft 55 in the opposite direction from the mirror image of the spring 73 reflected in the radial plane of the pin 68. The spring 74 has at one end an axially extending release toe 82 which engages the drive pin 68 on the opposite side from the toe 75 (FIG. 5). The end portion 83 of the spring 74 opposite the release toe 82 is engaged by a rotatable hub 84 which is attached to the output shaft 55 by means such as pins 85 (FIG. 6). The outer diameter of the spring end portion 83 is slightly larger than the inner diameter of the rotatable hub 84 providing an interference fit. The portion of the spring 74 adjacent to the release toe 82 is engaged by the stationary hub 80 with the outer diameter of that portion of the relaxed spring 74 being slightly larger than the inner diameter of the hub 80.

The operation of the linear motion mechanism 53 is essentially the same as that of the mechanism pin already described. As the drive shaft 64 and gears 65 and 66 rotate the input shaft 63 in a clockwise position (as viewed in FIG. 6), the drive pin 68 attached to the shaft 63 engages the release toe 75 to wrap the spring 73 around the output shaft 55, decreasing the outer diameter of the spring 73 so that the spring no longer engages the stationary hub 80. Since the end portion 76 of the spring 73 is connected to the shaft 55 through an interference fit with the rotatable hub 78, the clockwise rotation of the spring 73 causes the shaft 55 to rotate clockwise. The pin 68 which is mounted in the input shaft 55 engages the slot wall 71 on the output shaft 63, and the output shaft is directly driven by the input shaft. As the output shaft 55 rotates, the attached rotatable hub 84 rotates. The spring end portion 83 connected to the rotatable hub 84 rotates clockwise, causing the outer diameter of the spring 74 to decrease slightly, disengaging the spring 74 from the stationary hub 80.

When the input shaft 63 is rotated in the counterclockwise direction (as viewed in FIG. 6), the drive pin 68 engages the release toe 82 of the spring 74 winding the spring 74 around the shaft 55, so that the spring 74 disengages from the stationary hub 80. The connection of the spring end portion 83 to the shaft 55 causes the shaft to begin to rotate, and when the pin 68 engages the wall 70 of the slot 69, the output shaft 55 is driven by the input shaft 63 to rotate counterclockwise. As the shaft 55 rotates, the rotatable hub 78 and the connected spring end portion 76 also rotate to decrease the outer diameter of the spring 73, so that the spring 73 disengages from the stationary hub 80.

If a back force is applied to the ball nut 61, and thus applying a torque to the ball screw 60 and the output shaft 55, the mechanism locks, preventing this motion from being transmitted to the input shaft 63 and the gears 65 and 66 and the drive shaft 64. If a forward force (to the right in FIG. 5) is applied to the ball nut 61, torque would be applied to the ball screw 60 in the clockwise direction (as viewed in FIG. 6). The output shaft 55 would attempt to rotate clockwise, but the spring 73 would be wound tight against the stationary hub 80, preventing this torque from being transmitted to the input shaft 63. Similarly, if a force is applied to the ball nut 61 in the rearward direction (to the left in FIG. 5) a torque would be applied in the counterclockwise direction (as viewed in FIG. 6) to the ball screw 60 and the output shaft 55. This torque would be absorbed by the spring 74 the outer diameter of which would be increased by the torque forcing the spring against the stationary hub 80, and preventing the torque from being transmitted to the input shaft 63.

If, for example, the input shaft 63 is rotating clockwise (in FIG. 6), and the release toe 75 breaks from the spring 73, the spring would relex and engage the stationary hub 80, thus locking the output shaft 55 in its last operational position.

Other modifications and variations will be apparent to those skilled in the art all within the intended scope and spirit of the invention. While the invention has been shown and described with respect to specific embodiments thereof, these are intended for the purpose of illustration rather than limitation. Accordingly, this patent is not to be limited to the specific embodiments herein shown and described, nor in any other way which is consistent with the extent to which the progress in the art has been advanced by this invention.

What is claimed is:

1. A mechanism for producing linear motion from a rotating input while preventing transmission of back forces in either direction, which comprises:

a housing;

an output shaft mounted for rotation within the housing;

a rotatable input drive means coaxially mounted around the output shaft, the drive means having a central opening through which the output shaft extends, the drive means including a radially extending impelling portion, the output shaft extending axially on both sides of the impelling portion, the impelling portion comprising a circumferential elongated keyway means along a portion of the central opening, the circumferential extent of the keyway means defined by a pair of radially extending walls;

a tubular hub fixedly mounted on the housing and extending around the output shaft on each side of the impelling portion of the drive means;

a pair of coil springs wrapped around the output shaft, one spring on each side of the impelling portion of the drive means, each spring having a release toe at one end which extends axially to the impelling portion and which is capable of being engaged by one of the walls of the keyway means upon rotation of the drive means, the other end of each spring engaging the shaft to rotate therewith, a portion of each spring having a relaxed outer diameter larger than the inner diameter of the hub, whereby the springs engage the hub when relaxed; and means for producing linear motion from the rotation of the output shaft.

2. A mechanism as in claim 1, wherein the impelling portion of the drive means includes means for engaging a portion of the output shaft.

3. A mechanism as in claim 1, comprising in addition spacer means on the output shaft for maintaining the springs in position with the release toes extending to the impelling portion.

4. A mechanism as in claim 1, wherein said other end of each spring engages the output shaft with the inner diameter of the spring being slightly smaller than the outer diameter of the output shaft.

5. A mechanism as in claim 1 wherein a pair of second tubular hubs are fixedly mounted to rotate with the output shaft, the second hubs extending over said other end of each spring to provide means by which each spring engages the output shaft to rotate therewith, the portion of each spring adjacent one of said second hubs having an outer diameter larger than the inner diameter of the adjacent second hub.

6. A mechanism in claim 1 wherein the output shaft has a threaded screw portion at one end, and wherein the means for producing linear motion comprises a ball nut means mounted on the threaded portion of the output shaft.

7. A mechanism as in claim 1 wherein the input drive means comprises gear means coaxially mounted on the shaft over output shaft.

8. A mechanism as in claim 1, wherein the output shaft has a radially projecting pin extending into the keyway means.

9. A mechanism for producing linear motion from a rotating input while preventing the transmission back forces in either direction which comprises:

a housing;

an output shaft mounted for rotation within the housing, a shaft having a radially projecting pin near one end and having a threaded screw portion at the other end;

a rotatable input drive gear means coaxially mounted around the output shaft, the drive means having a central opening through which the output shaft extends, the drive gear means including a circumferentially elongated keyway means into which the pin extends, the circumferential extent of the keyway means defined by a pair of radially extending walls, one on each side of the pin;

a pair of tubular hubs fixedly mounted to the housing around the output shaft, one hub on each side of the drive gear means;

a pair of coil springs wrapped around the output shaft, one spring on each side of the keyway means, each spring having a release toe at one end which extends axially into the keyway means and which is capable of being engaged by one of the walls of the keyway means upon rotation of the drive gear means, one release toe on each side of the pin in the keyway means, the other end of each spring engaging the shaft to rotate therewith, a portion of each spring having a relaxed outer diameter larger than the inner diameter of the corresponding hub, whereby the springs engage the hub when relaxed; and a ball nut means mounted on the threaded portion of the output shaft to produce linear motion upon rotation of the shaft.

* * * * *